United States Patent [19]

Hansen

[11] Patent Number: 4,586,865
[45] Date of Patent: May 6, 1986

[54] ROTATABLE DISCHARGE CONVEYOR FOR A BELLY-DUMP TRAILER

[76] Inventor: John C. Hansen, 6765 SW. Norse Hall Rd., Tualatin, Oreg. 97062

[21] Appl. No.: 710,933

[22] Filed: Mar. 11, 1985

Related U.S. Application Data

[63] Continuation of Ser. No. 448,229, Dec. 9, 1982, abandoned.

[51] Int. Cl.$^4$ .............................................. B60P 1/36
[52] U.S. Cl. .................................. 414/519; 414/523; 414/528
[58] Field of Search ............... 414/505, 523, 528, 302, 414/503, 504, 519; 198/311, 317, 535, 536

[56] References Cited

U.S. PATENT DOCUMENTS

| | | | |
|---|---|---|---|
| 855,744 | 6/1907 | Argall | 414/302 X |
| 1,550,250 | 8/1925 | Hackett | 198/311 X |
| 2,564,020 | 8/1951 | Mengel | 414/523 |
| 2,649,185 | 8/1953 | Lichtenberg | 198/311 |
| 2,757,808 | 8/1956 | Mendez | 414/523 |
| 3,008,566 | 11/1961 | Biedess | 198/317 X |
| 3,145,855 | 8/1964 | Plugge et al. | 414/302 |
| 3,322,257 | 5/1967 | Phillips | 414/505 X |
| 3,391,778 | 7/1968 | Lasiter | 198/536 X |
| 3,877,586 | 4/1975 | Quester | 414/302 |
| 3,917,084 | 11/1975 | Swisher, Jr. et al. | 414/523 |
| 4,278,190 | 7/1981 | Oory et al. | 198/311 X |
| 4,289,439 | 9/1981 | Hansson | 414/505 X |
| 4,389,150 | 6/1983 | Stenlund | 414/505 |
| 4,422,767 | 12/1983 | Yelton | 414/505 X |

*Primary Examiner*—Robert J. Spar
*Assistant Examiner*—David A. Bucci
*Attorney, Agent, or Firm*—Chernoff, Vilhauer, McClung, Birdwell & Stenzel

[57] ABSTRACT

A rotatable conveyor apparatus for selectively discharging bulk material in any direction from the hopper of a belly-dump trailer is operatively supported in horizontal cantilever fashion by a rotatable material feed joint located beneath the hopper for rotation about a generally vertical axis. The conveyor and feed joint assembly are rigidly attached to and supported by an elongate, vertically oriented rotary shaft which is journaled in widely-spaced bearings which are positionally fixed by a rigid framework within the hopper of the trailer. The rigidly connected shaft, feed joint, and conveyor are operatively carried by the vehicle and may be rotated in unison to discharge the load to either side of the trailer without operatively disconnecting the conveyor from the trailer.

8 Claims, 4 Drawing Figures

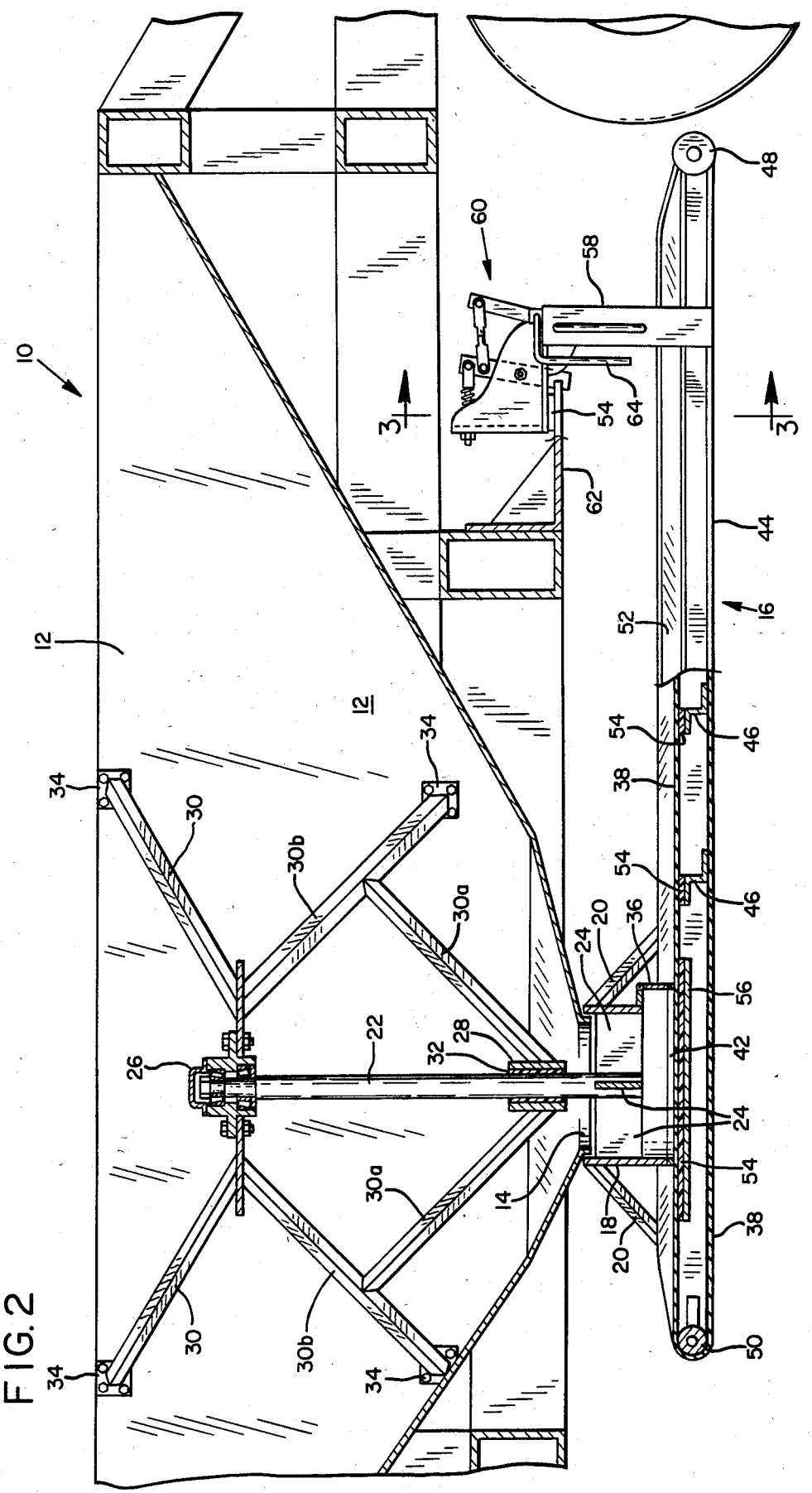

ROTATABLE DISCHARGE CONVEYOR FOR A BELLY-DUMP TRAILER

This application is a continuation of application Ser. No. 448,229, filed Dec. 9, 1982 now abandoned.

BACKGROUND OF THE INVENTION

This invention relates to an operatively carried rotatable discharge conveyor for discharging bulk material from a belly-dump trailer, and more particularly to a rotatable material feed joint for rotatably supporting such a conveyor in cantilever fashion operatively to receive material from the trailer and selectively discharge such material in any of a plurality of alternative directions with respect to the trailer.

Conventional "belly-dump" trailers for transport of bulk material such as pea gravel, sand or grain typically have at least one funnel-shaped material hopper with a lower discharge port located between the front of the trailer and the rear wheels. Such a trailer may dump the whole load into a sub-surface bin or, by moving the trailer while dumping, may deposit the load of bulk material in an elongate windrow which passes between the rear wheels of the trailer. Since the trailer is only capable of dumping immediately beneath itself, if the vehicle and trailer are unable to be positioned immediately over the desired discharge area, the discharged material must be handled again to move it to the desired location. Another limitation of this type of trailer is that a point discharge of the entire load of the bulk material is impractical because the rear wheels of the trailer must be able to pass over or to either side of the discharged load.

Prior art vehicles such as Swisher, U.S. Pat. No. 3,917,084 have attempted to overcome some of these limitations by providing a belly-dump trailer with a conveyor to carry the material from the bottom of the material hopper to a discharge position behind the rear wheels of the trailer so that the rear wheels of the trailer do not have to pass over or around the discharged load. Such a trailer is still limited in that it must be able to straddle or back up to the desired discharge location, and could not, for example, deposit the load into a ditch off to the side of the trailer.

Mendez, U.S. Pat. No. 2,757,808 provides a side unloading capability to belly-dump trailers by means of a detachable conveyor which may be operatively mounted beneath the hopper and supported by a rotatable boom mounted on one side of the trailer to discharge material to that side of the trailer. Once the conveyor is operatively connected to the bottom of the hopper, the conveyor may be rotated about a generally horizontal axis by the supporting boom for discharging to a point which is vertically above a horizontal plane passing through the bottom of the hopper. The conveyor of Mendez is limited to discharging only to one side of the trailer and only in a direction perpendicular to the longitudinal axis of the trailer. It must also be attached and detached from the hopper and swung between its operative position and its unoperative carrying position by the operator before and after unloading.

SUMMARY OF THE INVENTION

The aforementioned problems associated with belly-dump trailers are overcome by the present invention which provides an operatively carried rotatable discharge conveyor positioned beneath the discharge port of the trailer hopper by a rotatable material feed joint to enable discharge of the bulk material in virtually any horizontal direction with respect to the trailer, without operatively connecting or disconnecting the conveyor from the trailer.

A rotatable, selectively operable conveyor is positioned beneath the discharge port of a belly-dump trailer hopper by a rotatable material feed joint which directs material from the hopper to the conveyor. One end of the conveyor is rigidly supported by the feed joint in cantilever fashion so that the conveyor rotates in unison with the feed joint. The conveyor and feed joint rotate about a generally vertical axis and the conveyor extends out from the feed joint transversely to such an axis. The feed joint is rigidly connected to and supported by an elongate vertically oriented rotary shaft, for rotating the conveyor and feed joint about a generally vertical axis, extending upwardly into the hopper from the feed joint and supportably journaled adjacent its ends in two spaced-apart bearings carried by an interior supporting structure which is rigidly fixed to the inside of the hopper. The interior supporting structure includes a framework of multiple structural members rigidly attached to the interior walls of the hopper for fixedly positioning the two bearings which supportably and rotatably carry the elongate rotary shaft and its pendant feed joint and conveyor. The upper bearing is a thrust-type bearing capable of axially supporting the rotary shaft, feed joint and conveyor assembly as well as resisting generally horizontal forces resulting from the cantilevered mounting of the conveyor. The lower bearing resists the generally horizontal forces caused by the cantilevered conveyor.

The feed joint includes a power operated material door in the lower portion thereof adjacent to the conveyor and opening toward the discharge end of the conveyor to allow material to be carried out of the feed joint by the conveyor and to keep material from spilling out of the feed joint onto the conveyor when the conveyor is not operating.

A releasable latch is mounted above the discharge end of the conveyor with a mating latch member formed in a support shelf mounted on the underbody of the trailer so that the discharge end of the conveyor may be locked against rotation and supported beneath the trailer during transport. The latch is mounted sufficiently above the bed of the conveyor so that the conveyor may be operated and material may be discharged from the conveyor while the conveyor is supportably latched beneath the trailer.

In operation, material in the hopper may be discharged in virtually any horizontal direction with respect to the trailer by rotating the feed joint and conveyor to the desired position, opening the material door of the feed joint and operating the conveyor. Of course, such discharge may occur while the vehicle is moving or stationary, as the situation requires.

Accordingly, it is a principal objective of the present invention to provide an improved discharge conveyor for a belly-dump trailer.

It is a further object of the present invention to provide such an apparatus capable of being rotated about a vertical axis to discharge material to either side of the trailer as well as underneath the trailer.

It is another object of the present invention to provide such an apparatus which remains operatively connected to the trailer during all phases of transport, rotation and discharge.

The foregoing and other objectives, features and advantages of the present invention will be more readily understood upon consideration of the following detailed description of the invention taken in conjunction with the accompanying drawings.

BRIEF DESCRIPTION OF THE DRAWINGS

FIG. 2 is a sectional elevational view of such a trailer having a rotatable discharge conveyor.

DETAILED DESCRIPTION OF THE INVENTION

Figure 1:
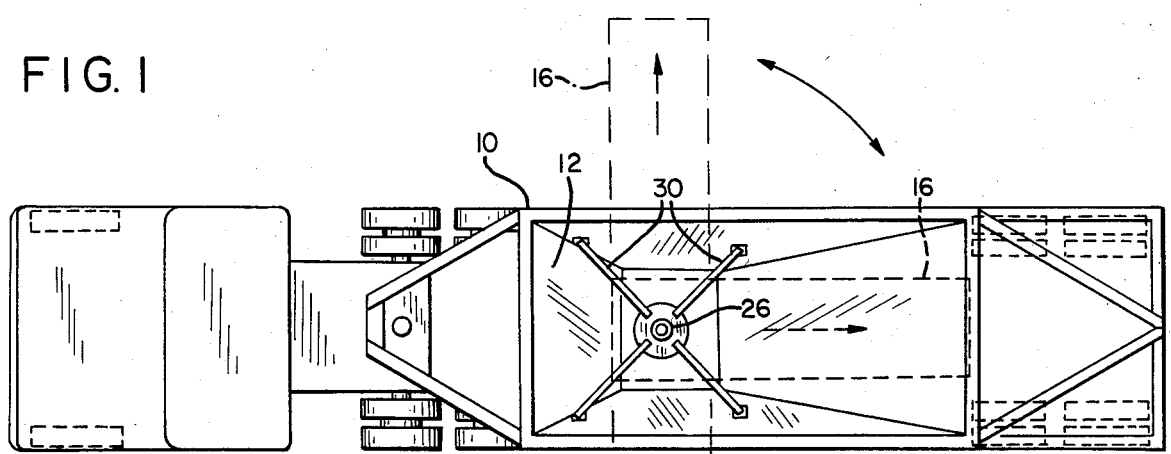
FIG. 1 is a plan view of a belly-dump trailer having a rotatable discharge conveyor showing alternative positions of the conveyor in dotted lines.
Figure 4:
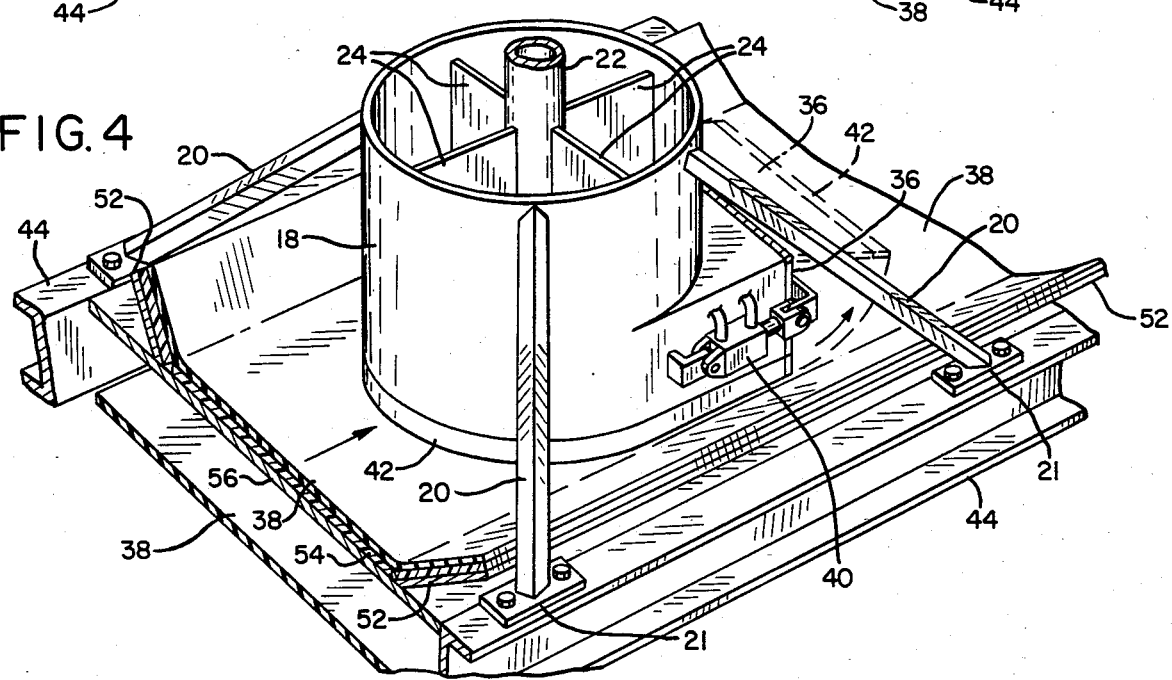
FIG. 4 is a fragmentary perspective view of the material feed joint and conveyor.

Referring to the exemplary embodiment shown in FIGS. 1 and 2, a belly-dump trailer 10 of the type having a funneling hopper 12 with a lower discharge port 14 is fitted with an elongate rotatable conveyor 16. The selectively operable conveyor 16 is horizontally, rigidly supported adjacent to the infeed end thereof beneath a generally vertically oriented, cylindrical, rotatable material feed joint 18 by four splayed struts 20 preferably welded to footpads 21 as shown in FIG. 4, which may be bolted to the conveyor for convenient disassembly. The feed joint and conveyor assembly are supported by an elongate, vertically oriented rotary shaft 22 extending upwardly from the feed joint into the hopper 12 through the generally cylindrical discharge port 14 for rotating the feed joint and conveyor about a generally vertical axis. The shaft is rigidly connected to the feed joint by four vertically oriented flanges 24 fixed to the lower outer surface of the shaft and the upper inner surface of the feed joint. The shaft is journaled in two bearings, an upper bearing 26 at the extreme upper end of the shaft and a lower bearing 28 which journals the shaft near the bottom of the hopper as shown in FIG. 2. The upper and lower bearings are rigidly positioned within the hopper by a support framework 30 attached to the walls of the hopper so that the feed joint is axially supported by the shaft directly beneath the discharge port of the hopper.

As explained above, the conveyor, feed joint and shaft are respectively rigidly connected to each other so that rotation of the vertical shaft within the bearings will cause the feed joint and conveyor to rotate in unison with the shaft. It should be noted that the structural connections between the shaft, feed joint and conveyor, respectively, must be of sufficient strength so that the shaft and feed joint are capable of supporting the conveyor in cantilever fashion extending out from the feed joint generally transversely to the axis of rotation, and rotating the cantilevered conveyor even when material is being discharged by the conveyor. Upon reflection it will be obvious that the rigidly positioned, widely spaced bearings which journal the elongate shaft accommodate this cantilevered supporting of the conveyor. The upper bearing, having to axially support the vertical weight of the conveyor assembly as well as resist generally horizontal forces resulting from the moment of the cantilevered conveyor, is preferably a hub and bearing assembly having two sealed races of tapered roller bearings such as are used to journal wheels on the axles of heavy wheeled vehicles. The lower bearing, having to contend primarily with generally horizontal forces resulting from the cantilevered arrangement of the conveyor is preferably a non-lubricated bushing such as a UHMW (ultra-high molecular weight) plastic collar 32 which would not be harmed by grit from the load (sand, gravel, etc.) getting between the bushing and the shaft.

Of course the support framework 30 for supporting the shaft must also be sufficiently strong to resist the generally horizontal forces caused by the cantilevered conveyor, and, since the conveyor is fully rotatable as shown in FIG. 1, the framework must be able to resist forces in any horizontal direction. Therefore, as can be readily seen in FIG. 1, the support framework extends radially outward from the axis of rotation of the shaft to the walls of the hopper. The constituent members of the support framework 30 are preferably tubular to provide the greatest strength with the smallest surface area to interfere with the flow of the material through the hopper. Similarly, the lower support members 30a are preferably radially butted to the intermediate support members 30b rather than extending radially to the hopper wall in order to avoid further obstruction of the material flow near the discharge port. The support framework 30 is preferably welded to foot plates 34 which are bolted to the hopper body to facilitate easy removal of the entire conveyor assembly.

Turning now to the feed joint shown in FIG. 4, a selectively operable material door 36 located in the bottom portion of the feed joint near the conveyor belt 38 is arranged to open upwardly toward the discharge end of the conveyor. A reversible air cylinder 40 connected to the vehicular air system extends between the door and the feed joint to selectively open and close the door. When the door is positively closed by the air cylinder it will prevent material in the hopper from spilling out onto the conveyor during transport. Similarly, a semi-rigid, resilient skirt 42, preferably made of rubber, is attached to the bottom edge of the feed joint and the bottom of the door in close relationship to the conveyor belt to prevent material from escaping from underneath the feed joint while the door is closed without damaging the typically rubber conveyor belt 38.

Figure 3:
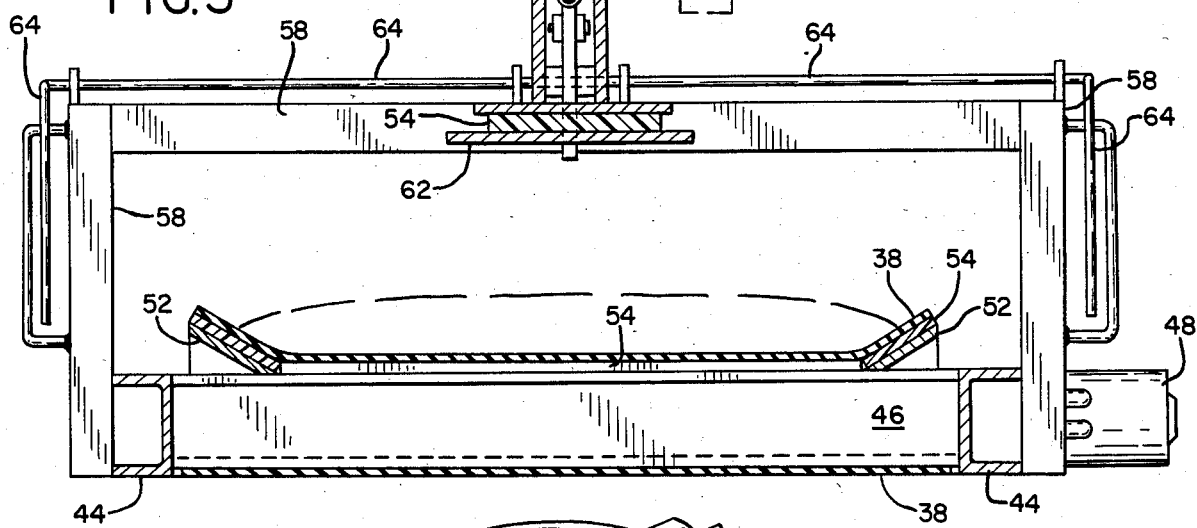
FIG. 3 is a sectional elevational view of the conveyor shown in FIG. 2 taken along line 3—3.

The conveyor, as shown in FIGS. 2, 3 and 4 comprises two parallel extending, elongate structural side members 44 which define the bed of the conveyor therebetween and has sufficient perpendicular cross members 46 extending therebetween to give the conveyor a rigid elongate rectangular shape as seen from above. An endless conveyor belt 38 is trained over and driven by a roller powered by a selectively operable conveyor motor 48, preferably hydraulic, located at the discharge end of the conveyor. The hydraulic motor may be connected to and powered by the vehicle hydraulic system with customary control valves and hydraulic lines. The belt is trained over a free turning roller 50 at the opposite, or infeed end of the conveyor.

The belt is urged into the shape of an elongate trough by two opposed, parallel extending, outwardly slanting banks 52 on either side of the bed of the conveyor to keep material which is being discharged by the conveyor from spilling over the sides of the conveyor. The belt is supported by the spaced cross members 46 and the slanting banks 52, both of which are covered with a layer of "frictionless" material such as UHMW plastic 54. Additionally, a reinforcing plate 56, also covered with a layer of UHMW plastic 54, extends between the side members 44 of the conveyor directly beneath the feed joint to support the considerable weight of the material in the hopper pressing down through the feed joint.

A bridge 58, extending above and across the bed of the conveyor between the side members adjacent the discharge end of the conveyor mounts a supporting spring-loaded latch assembly 60. The latch assembly engages a mating latch member formed in a supporting shelf 62 which is fastened to the underbody of the trailer. The shelf is positioned so that when the conveyor is swung underneath the trailer, the shelf will support the discharge end of the conveyor and the latch assembly will automatically engage the latch member formed in the supporting shelf and prevent the conveyor from rotating without releasing the latch. Release of the latch assembly is accomplished by means of a latch handle 64 extending along the top of the bridge from the latch assembly to both sides of the conveyor so that the operator may release the latch and rotate the conveyor out from underneath the trailer from either side without having to go completely beneath the trailer.

In operation, the hopper 12 would be typically loaded from above with bulk material. The conveyor 16 would be supported in position under the trailer as shown in FIG. 2 with the upper bearing 26 and the support shelf 62 cooperatively carrying the weight of the conveyor assembly. The latch assembly 60 would be in engagement with the latch member formed in the supporting shelf to prevent the conveyor from rotating about the longitudinal axis of the shaft 22.

The material being deposited in the hopper would fill the feed joint 18 and fill in around the support structure 30 within the hopper, the material being prevented from escaping onto the conveyor by the material door 36 and the skirting 42. As the load is transported to the desired location, the dynamic stresses on the support structure 30 due to the cantilevered mounting of the conveyor assembly are alleviated by the support shelf 62. At the discharge location, the operator may release the latch assembly by means of the latch handle and rotate the conveyor to a discharge position at any angle to either side of the vehicle without operatively connecting or disconnecting the conveyor from the hopper.

By opening the material door and operating the conveyor motor 48, the load may be discharged to either side of or underneath the trailer. The material may be discharged at a point location, or, by moving the trailer, into a windrow parallel to the trailer's travel. This latter method is particularly suited to filling utility ditches located adjacent and parallel to a roadway.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A bulk material discharge apparatus adapted to be operatively carried on a vehicle of the type having a material hopper and a lower discharge port, for selectively discharging bulk material from said port in any of a plurality of alternative directions with respect to said vehicle, said apparatus comprising:
   (a) a material feed joint for receiving material from said discharge port, said feed joint including a tubular housing having an open top communicating with said discharge port and an open bottom;
   (b) support means adapted to be rigidly attached to said vehicle for mounting said feed joint to said vehicle;
   (c) elongate conveyor means rigidly mounted to said tubular housing for receiving material from said tubular housing and selectively discharging material in any of said alternative directions;
   (d) said support means further including an elongate vertically-oriented shaft having two ends and being journaled with respect to said support means adjacent each of said ends, said shaft being connected to said feed joint and serving as means for rotatably supporting said feed joint and said conveyor means with respect to said support means; and
   (e) said feed joint including elongate means oriented substantially longitudinally with respect to said shaft, rigidly connecting said shaft to said tubular housing for allowing the passage of material between said top and said bottom of said housing while also providing both vertical and cantilever support to said conveyor means and said feed joint from said shaft.

2. The apparatus of claim 1 wherein said elongate conveyor means has two ends and is mounted to said feed joint adjacent one end of said conveyor means and extends from said feed joint generally transversely to said shaft.

3. The apparatus of claim 1 wherein said shaft extends into said tubular housing of said feed joint through said top of said tubular housing.

4. The apparatus of claim 1 wherein said support means includes means for rotating said feed joint and said conveyor through an angle of at least 90 degrees with respect to said support means.

5. The apparatus of claim 1 including discharge means communicating between said tubular housing and said conveyor means for permitting material within said tubular housing to be discharged out of said tubular housing onto said conveyor means.

6. The apparatus of claim 5 wherein said discharge means includes operable door means proximate said bottom of said tubular housing for selectively permitting material within said tubular housing to be discharged onto said conveyor means.

7. The apparatus of claim 5 including sealing means cooperating between said bottom of said housing and said conveyor means for preventing material within said tubular housing from being discharged from said tubular housing except through said discharge means.

8. The apparatus of claim 1, said bottom of said tubular housing arranged closely adjacent to said conveyor means and cooperating with said conveyor means for preventing discharge of material within said tubular housing.

* * * * *